US011669353B1

(12) United States Patent
Sanghai et al.

(10) Patent No.: US 11,669,353 B1
(45) Date of Patent: Jun. 6, 2023

(54) SYSTEM AND METHOD FOR PERSONALIZING DIGITAL GUIDANCE CONTENT

(71) Applicant: Whatfix Private Limited, Bangalore (IN)

(72) Inventors: Abhishek Sanghai, Bengalaru (IN); Gourav H. Dhelaria, Bangalore (IN); Raj Ganesh, Bengalaru (IN); Samvit Majumdar, Bengalaru (IN); Maruthi Priya Kanyaka Vara Kumar Namburu, Bengalaru (IN)

(73) Assignee: Whatfix Private Limited, Bangalore (IN)

(*) Notice: Subject to any disclaimer, the term of this patent is extended or adjusted under 35 U.S.C. 154(b) by 0 days.

(21) Appl. No.: 17/643,683

(22) Filed: Dec. 10, 2021

(51) Int. Cl.
*H04L 67/564* (2022.01)
*G06F 9/451* (2018.01)
*H04L 67/50* (2022.01)

(52) U.S. Cl.
CPC ............ *G06F 9/453* (2018.02); *H04L 67/535* (2022.05); *H04L 67/564* (2022.05)

(58) Field of Classification Search
CPC ...... G06F 9/453; H04L 67/535; H04L 67/564
See application file for complete search history.

(56) References Cited

U.S. PATENT DOCUMENTS

| 7,203,620 B2 | 4/2007 | Li |
| 7,415,675 B2 | 8/2008 | Habon et al. |
| 7,533,369 B2 | 5/2009 | Sundararajan et al. |
| 7,849,405 B1 * | 12/2010 | Coletta ............... G06F 9/453 715/708 |
| 7,861,178 B2 | 12/2010 | Lui et al. |

(Continued)

FOREIGN PATENT DOCUMENTS

| WO | WO02/29759 A2 | 4/2002 |
| WO | WO2010/141748 A1 | 12/2010 |

OTHER PUBLICATIONS

MDN Web Docs; CSS selectors; 9 pages; retrieved from the interent (https://developer.mozilla.org/en-US/docs/Web/CSS/CSS_Selectors) on Aug. 6, 2020.

(Continued)

*Primary Examiner* — Stephen S Hong
*Assistant Examiner* — Ahamed I Nazar
(74) *Attorney, Agent, or Firm* — Shay Glenn LLP

(57) ABSTRACT

Provided herein are systems and methods for personalizing digital guidance for improved user adoption of an underlying computer application. In one exemplary implementation, a method includes identifying an underlying application, identifying different pages of the application, gathering usage data at a user level for n days, creating a user behavior matrix from the gathered data, performing a user similarity calculation for each pair of the users, tabulating a consumption count for each of the users, performing a series of score calculations for a recommendation user, calculating an intermediate score for each piece of content, counting a number of users who clicked on each piece of content, obtaining a final score for each piece of content, deciding on a ranking order of the content based on the final scores, and recommending content to the recommendation user from the ranking step.

20 Claims, 12 Drawing Sheets

(56) References Cited

U.S. PATENT DOCUMENTS

| | | | |
|---|---|---|---|
| 8,151,202 B1 | 4/2012 | Cronin et al. | |
| 8,707,177 B1 | 4/2014 | Parle et al. | |
| 8,850,315 B1* | 9/2014 | Rogers | G06F 16/9577 715/767 |
| 9,063,757 B2 | 6/2015 | Horton et al. | |
| 9,367,199 B2 | 6/2016 | Klemenz et al. | |
| 9,514,437 B2 | 12/2016 | Becker et al. | |
| 9,582,132 B1 | 2/2017 | Adelman et al. | |
| 9,727,348 B2 | 8/2017 | Chen et al. | |
| 10,489,041 B1 | 11/2019 | Edwards et al. | |
| 10,585,686 B2 | 3/2020 | Saurabh | |
| 10,802,846 B2 | 10/2020 | Rider et al. | |
| 2001/0017622 A1 | 8/2001 | Patel et al. | |
| 2005/0147054 A1 | 7/2005 | Loo et al. | |
| 2006/0036991 A1 | 2/2006 | Biazetti et al. | |
| 2006/0085750 A1 | 4/2006 | Easton et al. | |
| 2006/0117315 A1 | 6/2006 | Bussert et al. | |
| 2006/0277468 A1 | 12/2006 | Sapir | |
| 2007/0168864 A1 | 7/2007 | Yamamoto et al. | |
| 2008/0301558 A1 | 12/2008 | Najafi et al. | |
| 2010/0180185 A1* | 7/2010 | O'Hanlon | G06F 16/957 715/205 |
| 2010/0205529 A1 | 8/2010 | Butin et al. | |
| 2010/0205530 A1 | 8/2010 | Butin et al. | |
| 2011/0010612 A1 | 1/2011 | Thorpe et al. | |
| 2011/0035486 A1 | 2/2011 | Seolas et al. | |
| 2011/0307818 A1 | 12/2011 | Eby et al. | |
| 2013/0055201 A1 | 2/2013 | No et al. | |
| 2013/0097497 A1 | 4/2013 | Matejka et al. | |
| 2013/0129316 A1 | 5/2013 | Dontcheva et al. | |
| 2013/0326406 A1 | 12/2013 | Reiley et al. | |
| 2014/0316363 A1 | 10/2014 | You et al. | |
| 2014/0344683 A1 | 11/2014 | Urunga et al. | |
| 2015/0202529 A1* | 7/2015 | Paradise | A63F 13/30 463/31 |
| 2015/0220312 A1 | 8/2015 | Jemiolo | |
| 2015/0242304 A1 | 8/2015 | Akbulut et al. | |
| 2015/0254713 A1 | 9/2015 | Brewer et al. | |
| 2016/0004628 A1 | 1/2016 | Gugri | |
| 2016/0019387 A1* | 1/2016 | Sol | G06F 21/577 726/23 |
| 2016/0162167 A1 | 6/2016 | Shabazz et al. | |
| 2016/0246467 A1 | 8/2016 | Jemiolo et al. | |
| 2016/0246615 A1* | 8/2016 | Jemiolo | G06V 30/19013 |
| 2016/0247534 A1 | 8/2016 | Pan et al. | |
| 2016/0350137 A1 | 12/2016 | Kihara | |
| 2016/0351189 A1 | 12/2016 | Miller et al. | |
| 2017/0052824 A1 | 2/2017 | Sharma et al. | |
| 2017/0134828 A1 | 5/2017 | Krishnamurthy et al. | |
| 2017/0139656 A1* | 5/2017 | Sterling | H04L 65/61 |
| 2017/0177385 A1 | 6/2017 | Fung et al. | |
| 2017/0228349 A1* | 8/2017 | Yang | H04L 51/216 |
| 2017/0337122 A1 | 11/2017 | Bolajwar et al. | |
| 2018/0121047 A1 | 5/2018 | Goel et al. | |
| 2018/0143842 A1 | 5/2018 | Weiss et al. | |
| 2019/0065512 A1 | 2/2019 | Pestana et al. | |
| 2019/0066731 A1 | 2/2019 | Jarrell | |
| 2019/0318764 A1 | 10/2019 | Ishida et al. | |
| 2019/0370559 A1* | 12/2019 | Carter | G06V 20/52 |
| 2020/0021872 A1 | 1/2020 | Venkatraman et al. | |
| 2020/0035113 A1 | 1/2020 | Bruce et al. | |
| 2020/0225927 A1 | 7/2020 | Pachpande et al. | |
| 2021/0042134 A1 | 2/2021 | Elango et al. | |
| 2021/0158438 A1 | 5/2021 | Greenberg et al. | |
| 2021/0405998 A1 | 12/2021 | Namburu et al. | |
| 2021/0406047 A1 | 12/2021 | Namburu et al. | |

OTHER PUBLICATIONS

Interactions Foundation; Help! I need some help! Not just any help hel p in mobile applications; 10 pages, retreived from the internet (https://www.interaction-design.org/literature/article/help-i-need-some-help-not-just-any-help-help-in-mobile-applications) on Aug. 6, 2020.

USERLANE; 100 percent proficient with any software without it training; 13 pages; retrieved from the internet (https://blog.userlane.com/navigation-system-software/) on Aug. 6, 2020.

Yeo: Here's how this company is tackling the challenges of enterprise tech adoption; 6 pages; retrieved from the internet (https://www.techinasia.com/heres-company-tackling-challengess-enterprise-tech-adoption) on Aug. 6, 2020.

Namburu et al.; U.S. Appl. No. 17/234,743, entitled "System and method for automatic testing of digital guidance content," filed Apr. 19, 2021.

* cited by examiner

| User ID | Page1 | Page2 | Page3 | Page4 | Page5 | Page6 | Page7 | Page8 | Page9 | Page10 |
|---|---|---|---|---|---|---|---|---|---|---|
| u1 | 646 | 156 | 722 | 694 | 619 | 679 | 212 | 99 | 396 | 46 |
| u2 | 116 | 530 | 77 | 782 | 665 | 713 | 603 | 535 | 787 | 71 |
| u3 | 886 | 797 | 670 | 929 | 837 | 417 | 801 | 753 | 132 | 559 |
| u4 | 766 | 382 | 217 | 202 | 397 | 694 | 121 | 205 | 646 | 621 |
| u5 | 327 | 889 | 873 | 89 | 167 | 680 | 987 | 936 | 940 | 569 |
| u6 | 386 | 24 | 193 | 723 | 392 | 373 | 337 | 50 | 487 | 513 |
| u7 | 277 | 613 | 404 | 980 | 344 | 193 | 775 | 821 | 363 | 474 |
| u8 | 75 | 588 | 597 | 660 | 945 | 439 | 646 | 958 | 466 | 396 |
| u9 | 512 | 104 | 14 | 316 | 383 | 535 | 67 | 300 | 902 | 65 |
| u10 | 595 | 218 | 115 | 684 | 38 | 795 | 414 | 229 | 564 | 263 |

FIG. 6

| Page | u1 (x) | u6 (y) | $\bar{x}$ | $\bar{y}$ | xi - $\bar{x}$ | yi - $\bar{y}$ | (xi - $\bar{x}$)(yi - $\bar{y}$) -> Numerator | (xi - $\bar{x}$)^2 | (yi - $\bar{y}$)^2 | Denominator | Correlation |
|---|---|---|---|---|---|---|---|---|---|---|---|
| Page1 | 646 | 386 | 426.9 | 347.8 | 219.1 | 38.2 | 8369.62 | 48004.81 | 1459.24 | | |
| Page2 | 156 | 24 | 426.9 | 347.8 | -270.9 | -323.8 | 87717.42 | 73386.81 | 104846.44 | | |
| Page3 | 722 | 193 | 426.9 | 347.8 | 295.1 | -154.8 | -45681.48 | 87084.01 | 23963.04 | | |
| Page4 | 694 | 723 | 426.9 | 347.8 | 267.1 | 375.2 | 100215.92 | 71342.41 | 140775.04 | | |
| Page5 | 619 | 392 | 426.9 | 347.8 | 192.1 | 44.2 | 8490.82 | 36902.41 | 1953.64 | | |
| Page6 | 679 | 373 | 426.9 | 347.8 | 252.1 | 25.2 | 6352.92 | 63554.41 | 635.04 | | |
| Page7 | 212 | 337 | 426.9 | 347.8 | -214.9 | -10.8 | 2320.92 | 46182.01 | 116.64 | | |
| Page8 | 99 | 50 | 426.9 | 347.8 | -327.9 | -297.8 | 97648.62 | 107518.41 | 88684.84 | | |
| Page9 | 396 | 487 | 426.9 | 347.8 | -30.9 | 139.2 | -4301.28 | 954.81 | 19376.64 | | |
| Page10 | 46 | 513 | 426.9 | 347.8 | -380.9 | 165.2 | -62924.68 | 145084.81 | 27291.04 | | |
| Total | | | | | | | 198208.8 | 680014.9 | 409101.6 | 527442.114 | 0.38 |

FIG. 7

| Click User ID | Recommendation User ID | Similarity |
|---|---|---|
| u1 | u6 | 0.38 |
| u2 | u6 | 0.21 |
| u3 | u6 | -0.11 |
| u4 | u6 | 0.25 |
| u5 | u6 | -0.64 |
| u6 | u6 | 1.00 |
| u7 | u6 | 0.03 |
| u8 | u6 | -0.28 |
| u9 | u6 | 0.34 |
| u10 | u6 | 0.53 |

FIG. 8

| Recommendation User ID | Click User ID | Content ID | Consumption Count | Similarity | Score |
|---|---|---|---|---|---|
| u6 | u1 | c1 | 34 | 0.38 | 12.78 |
| u6 | u1 | c2 | 27 | 0.38 | 10.15 |
| u6 | u1 | c3 | 25 | 0.38 | 9.39 |
| u6 | u1 | c4 | 22 | 0.38 | 8.27 |
| u6 | u1 | c5 | 21 | 0.38 | 7.89 |
| u6 | u1 | c6 | 21 | 0.38 | 7.89 |
| u6 | u2 | c1 | 18 | 0.21 | 3.79 |
| u6 | u2 | c3 | 16 | 0.21 | 3.37 |
| u6 | u2 | c4 | 15 | 0.21 | 3.16 |
| u6 | u2 | c5 | 14 | 0.21 | 2.95 |
| u6 | u3 | c2 | 13 | -0.11 | -1.49 |
| u6 | u3 | c7 | 13 | -0.11 | -1.49 |
| u6 | u4 | c8 | 13 | 0.25 | 3.21 |
| u6 | u5 | c2 | 13 | -0.64 | -8.29 |
| u6 | u5 | c5 | 12 | -0.64 | -7.65 |
| u6 | u7 | c3 | 12 | 0.03 | 0.32 |
| u6 | u8 | c9 | 12 | -0.28 | -3.40 |

FIG. 9

| Recommendation User ID | Content ID | Intermediate Score | Click User Count | Final Score | Rank |
|---|---|---|---|---|---|
| u6 | c1 | 16.57 | 2 | 8.28 | 1 |
| u6 | c6 | 7.89 | 1 | 7.89 | 2 |
| u6 | c4 | 11.43 | 2 | 5.71 | 3 |
| u6 | c3 | 13.08 | 3 | 4.36 | 4 |
| u6 | c8 | 3.21 | 1 | 3.21 | 5 |
| u6 | c5 | 3.19 | 3 | 1.06 | 6 |
| u6 | c2 | 0.37 | 3 | 0.12 | 7 |
| u6 | c7 | -1.49 | 1 | -1.49 | 8 |
| u6 | c9 | -3.40 | 1 | -3.40 | 9 |

FIG. 10

SYSTEM AND METHOD FOR PERSONALIZING DIGITAL GUIDANCE CONTENT

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

There are many ways for end users to learn how to use a particular software application. Increasingly, many methods take the form of digital guidance, such as a Help Section built into the software application or links to online help content. Examples of online help or learning content include knowledge bases, answers to Frequently Asked Questions (FAQs), tutorials, videos, PDF documents, etc. "Walk-throughs" may be provided in either scenario, wherein the user is walked through a particular task or process step by step in the actual software application.

All of the digital guidance content may be provided to a user in one place, organized with a table of contents and or an index, and it may be searchable using keywords. Still, it may be overwhelming to a user to be provided with so much content at once. It is desirable to only provide a limited amount of digital guidance content to a user at any one time, focused on what they may currently need help with and not showing them content that is not currently relevant to what they are doing. Accordingly, a limited number of hyperlinks or other pathways to relevant content may be provided in various sections or segments of the software, and these links may change depending on the task being performed by the end user and or their location in the software application.

Currently when the users open self-help, all the users see the same set of contents as designed by the content creators. But the needs of individual users vary and hence, they have to spend time seeking out the particular content they need.

What is needed and is not provided by the prior art are improved systems and methods for providing digital guidance content, while reducing the burden being placed on the creators of the content. The innovations described herein solve these unmet needs and provide additional advantages.

SUMMARY OF THE DISCLOSURE

According to aspects of the present disclosure, methods of personalizing digital guidance for use in an underlying computer application are provided. In some embodiments, a method includes the steps of identifying an underlying application in which it is desired to provide personalized guidance content, and identifying different pages of the underlying application from which usage data will be gathered. In these embodiments, the method further includes gathering usage data of the underlying application at a user level for n days. A user behavior matrix is then created from the gathered data with one axis of the matrix representing users of the underlying application and another axis of the matrix representing the different pages of the underlying application. The values in the matrix can represent a predetermined measure of each of the users' behavior on the different pages. Using the behavior matrix, a user similarity calculation can be performed for each pair of the users to obtain a similarity number for each of the pairs of users. The method further includes tabulating a consumption count for each of the users and a particular piece of digital guidance content each user has consumed. Each of the consumption counts reflects a number of times a particular user has consumed the particular content. Using the user similarity numbers and the consumption counts, a series of score calculations may be performed for a recommendation user, wherein each of the score calculations is a product of one of the consumption counts and an associated one of the similarity numbers. An intermediate score may be calculated for each of the pieces of content from the tabulating step, wherein each of the intermediate scores is calculated by summing the series of score calculations for each of the pieces of content. A number of users who clicked on each of the pieces of content is counted to obtain a click user count for each piece of content. A final score may be obtained for each of the pieces of content by dividing its intermediate score by its click user count. A ranking order of the content for the recommendation user can then be decided upon based on the final scores placed in descending order. The method includes recommending at least a highest ranked piece of content from the ranking step to the recommendation user.

In some embodiments, the gathering usage data step comprises recording a number of visits made by each of the users on the underlying application and or recording an amount of time each of the users spends on each of the different pages of the underlying application. The values of the user behavior matrix may act as a hyperparameter. In some embodiments, the values of the user behavior matrix comprise a sum of time spent by each of the users across visits on each of the different pages and or an average amount of time spent by the users per visit on the different pages.

In some embodiments, the method further includes a step of standardizing the values of the user behavior matrix. This step of standardizing the values may include rescaling the values to have a mean of 0 and a standard deviation of 1. In some embodiments, the method further includes a step of normalizing the values of the user behavior matrix. This step of normalizing the values may include rescaling the values so that they all fall into a range of 0 to 1.

In some embodiments, the user similarity calculations are based on one or more distance metrics selected from a group consisting of Correlation, Euclidean Distance, Manhattan Distance, Minkowski Distance and Hamming Distance. In some embodiments, the user similarity calculations act as a hyperparameter. In some embodiments, the pieces of content comprise walkthroughs. In some embodiments, all of the users who have consumed at least one of the pieces of content during the n days are used in the user similarity calculations. In some embodiments, some of the users who have consumed at least one of the pieces of content during the n days but have a low similarity number are not used in the tabulating and subsequent steps. In some embodiments, a quantity of the users who have a high similarity number and are used in the tabulating and subsequent steps is used as a hyperparameter.

According to aspects of the present disclosure, a non-transitory computer readable medium is provided having instructions stored thereon for personalizing digital guidance for use in an underlying computer application. The instructions are executable by a processor to cause a computer to perform some or all of the previously described method steps.

BRIEF DESCRIPTION OF THE DRAWINGS

The novel features of the disclosure are set forth with particularity in the claims that follow. A better understanding of the features and advantages of the present disclosure will be obtained by reference to the following detailed description that sets forth illustrative embodiments, in which the principles of the disclosure are utilized, and the accompanying drawings of which:

FIG. 6 is a table showing a user behavior matrix.

FIG. 7 is a table showing a correlation calculation for one pair of users.

FIG. 8 is a table showing a similarity number calculated for each click user relative to a recommendation user.

FIG. 9 is a table showing a score calculated for each combination of Click User ID and Content ID relative to a Recommendation User ID.

FIG. 10 is a table showing a Final Score and Rank calculated for each Content ID relative to a Recommendation User ID.

DETAILED DESCRIPTION

Described herein are apparatuses (e.g., systems, computing device readable media, devices, etc.) and methods for an improved digital guidance platform. The innovative platform changes the way application support and learning content is consumed. In some embodiments, this is accomplished by providing contextual and interactive walkthroughs inside software applications at the time a task is being performed (i.e. providing real-time guidance to users.) Examples of software applications that the platform may be used with include Salesforce®, Oracle CRM®, Microsoft Dynamics®, Success Factors®, SharePoint® and other applications. In some embodiments, the innovative platform may take the form of a simple web browser extension. Developers of a software application may use the extension to provide guided navigation to users of the software application so that the users can quickly learn how to use the application. The users' training and or support experience can be enhanced with walkthroughs, smart pop-ups and tool-tips provided by the platform. These platform tools may be configured to show up based on a particular user's role and current location in the software application. The innovative platform may be used with enterprise application software (such as the software applications mentioned above), custom application software (such as created by an IT department for a company's internal use), and end user software. Depending on the application, the innovative platform may the only training and support program for the application, or it may be used in conjunction with a training and support program native to the application.

In some embodiments, the innovative platform supports an end user through their entire life cycle with a software application. This may include new user onboarding, continuous training, self-serve contextual support, assistance with data field validation, and application change management. The platform technology may include omni-channel integrations (such as integrating with knowledge systems, bases and repositories), workflow automation, in-place answers, workflow analytics, and content authoring.

Figure 1:
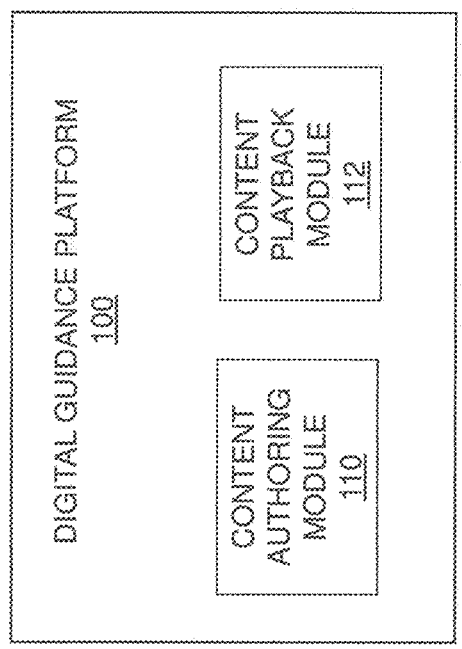
FIG. 1 is a diagram showing an example of a digital guidance platform configuration for providing digital guidance in an underlying computer application.

Referring to FIG. 1, an exemplary digital guidance platform 100 is depicted. It may include a content authoring module 110 (also referred to as an editor) and a content playback module 112, as shown. In this exemplary embodiment, the content authoring module 110 allows a content author to create digital guidance for end users of an underlying software application. Once this content is created and saved, it may be accessed or "played back" using the content playback module 112. In some implementations, the content authoring module 110 and the content playback module 112 are combined and provided to a content author in a single software package. In use, the software package may reside on a content author's computer, and or may reside on a server in "the cloud" and be offered as Software as a Service (SaaS.) In other implementations, content authoring module 110 and a content playback module 112 may be separately deployed. For example, one of the modules may take the form of a simple web browser extension as previously mentioned, and the other module may be downloaded to a content author's computer.

Figure 2:
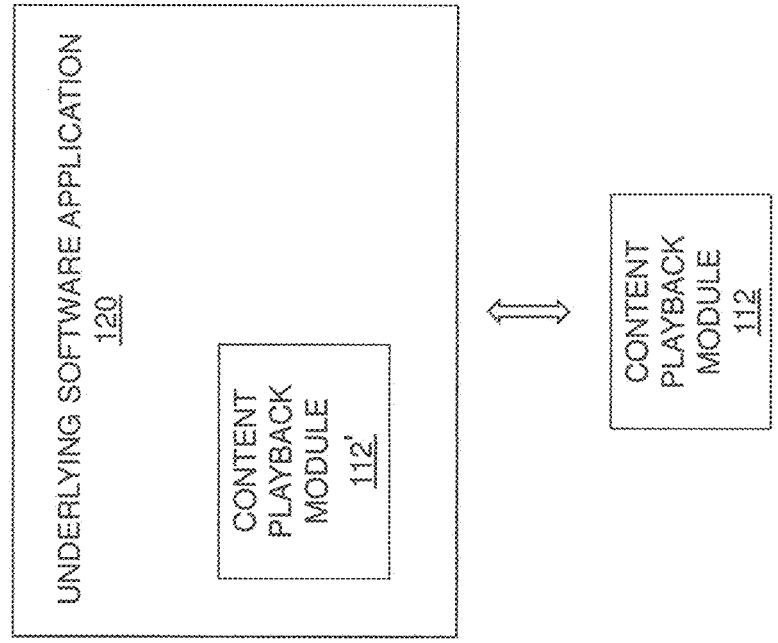
FIG. 2 is a diagram showing exemplary configurations of how the digital guidance platform of FIG. 1 interfaces with an underlying computer application.

Referring to FIG. 2, exemplary content playback configurations are depicted. In some implementations, content playback module 112 is a standalone system that is accessed by an end user from within an underlying software application 120. For example, an underlying software application 120, such as Salesforce®, may be provided with links to access content playback module 112, which is located on a server in the cloud. In some implementations, content playback module 112' may be integrated within the underlying software application 112'. In either of these exemplary configurations, the end user is able to access the digital guidance content from content playback module 112 or 112' while using a feature of underlying software application 120 with which the content is associated. In some implementations, both an integrated content playback module 112' and an external module 112 are available to the end user.

Figure 3A:
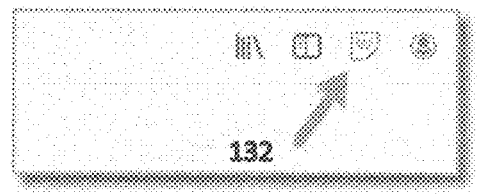
FIGS. 3A-3I are a series of partial screenshots showing exemplary functionality of a content authoring module/editor.

Referring to FIGS. 3A-3I, exemplary functionality of content authoring module/editor 110 will be described in relation to the exemplary partial screenshots in the figures. In this exemplary embodiment, the patent applicant's company name "whatfix" is used as the name of digital guidance platform 100. The exemplary functionality includes the ability to create a "walkthrough", which will walk an end user of underlying software application 120 through each sequential step of a particular task in application 120 when the walkthrough is played back. In some implementations, the walkthrough can proceed either one step at a time, waiting at the end of each step for the end user to advance the walkthrough to the next step. Alternatively, the walkthrough can proceed automatically, running through all of the steps without stopping (unless paused by the user.) Additionally, the walkthrough can provide the end result of the task that the walkthrough is teaching. For example, a walkthrough can show an end user each step needed to determine the number of open sales leads that have not been contacted, and at the end of the walkthrough the actual number is provided to the end user. Referring first to FIG. 3A, the creation of a walkthrough begins by the author logging in to the underlying application where the author wants to create content, and then launching the previously described content authoring module/editor 110 by clicking icon 132.

Figure 3B:
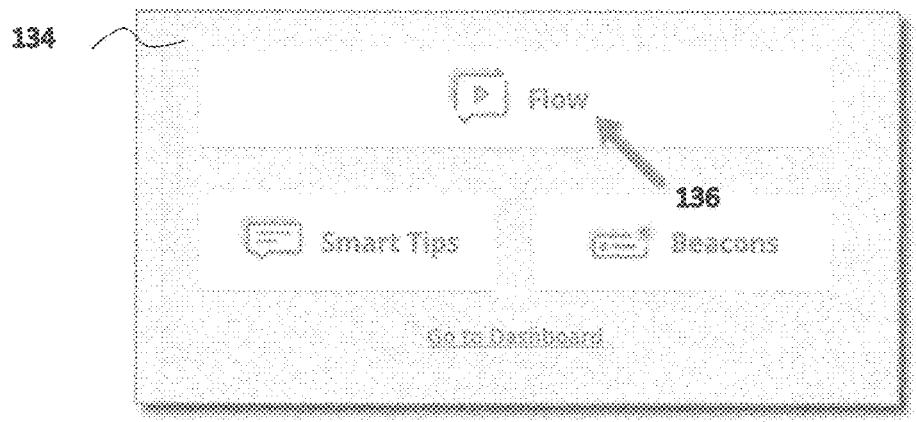

Once the editor launches, it displays window 134 as shown in FIG. 3B. Window 134 includes three buttons labeled Flow, Smart Tips and Beacons. The Flow button is for creating walkthroughs, the Smart Tips button is for creating content associated with data field validation, and the Beacons button is for creating content associated with software application change management. In this example the author clicks the Flow button 136.

Figure 3C:
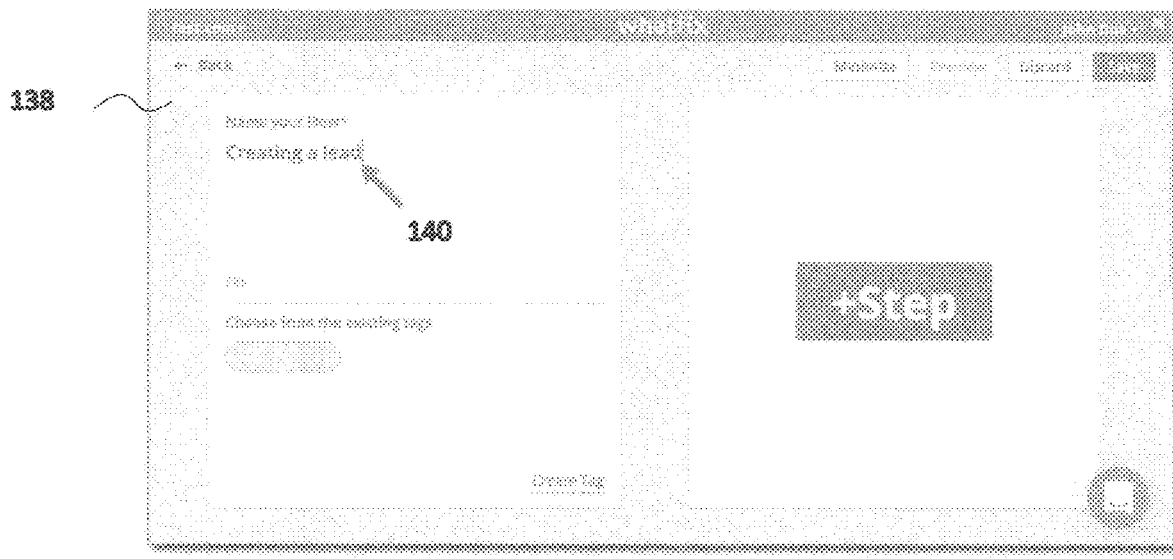

Clicking Flow button 136 opens window 138, as shown in FIG. 3C. Here the author can name the Flow or walkthrough as they want it to be displayed to an end user. In this example, the Flow is named "Creating a lead", as shown by arrow 140.

Figure 3D:
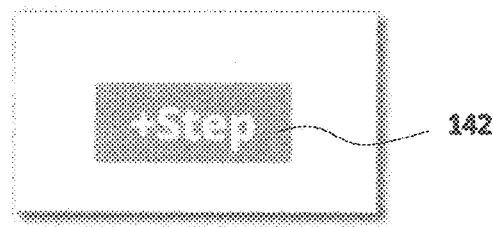
Figure 3E:
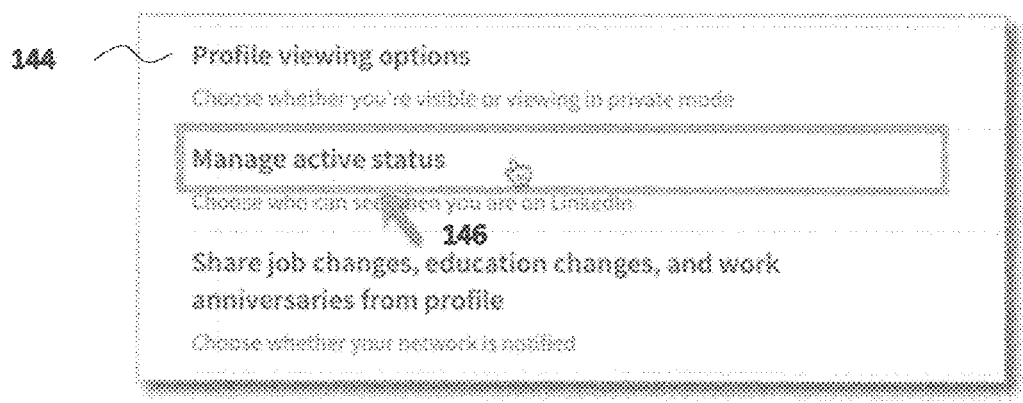

The author then clicks the +Step button 142, as shown in FIG. 3D. In some embodiments, the pointer icon changes (such as from an arrow to a hand), as shown in screen 144 of FIG. 3E, to indicate that the editor is waiting for the author to select a step of the sequence that the end user is to be guided through. The author then clicks the desired element on the page of the underlying software application that the end user will need to select. In this example, the end user will be guided to select the Manage Active Status button 146 on screen 144 during playback of the walkthrough, so the Flow author clicks button 146 at this time.

Figure 3F:
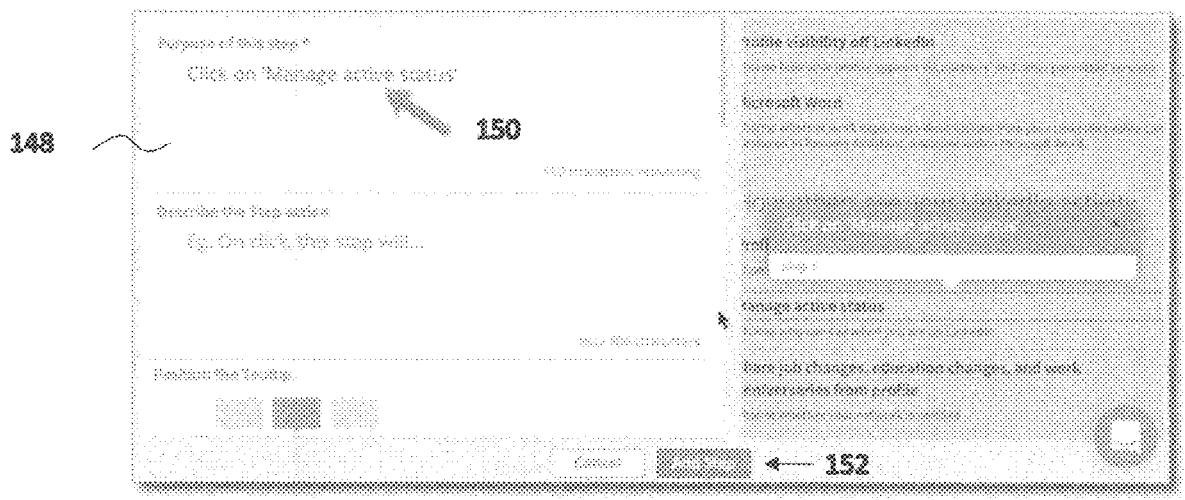

\After the Flow author clicks the desired element 146, the editor module displays screen 148 as shown in FIG. 3F with automatically generated action text 150 describing the particular step. The Flow author may then review, edit and or add text or other information associated with the step. The author may also select other parameters regarding how this step of the walkthrough will be played back, such as the position of the Tooltip on the screen, or accept some or all of the default settings. Once the parameters of this step are in order, the author then clicks the Add Step button 152.

Figure 3G:
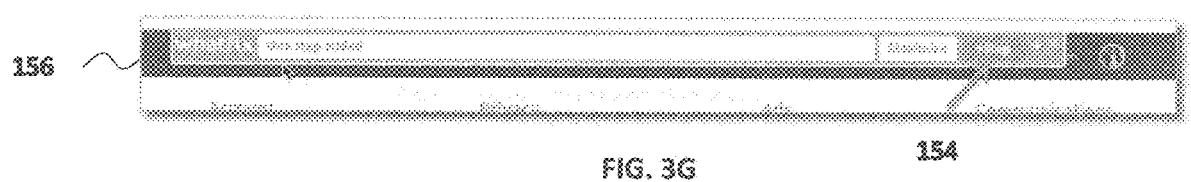
Figure 3H:
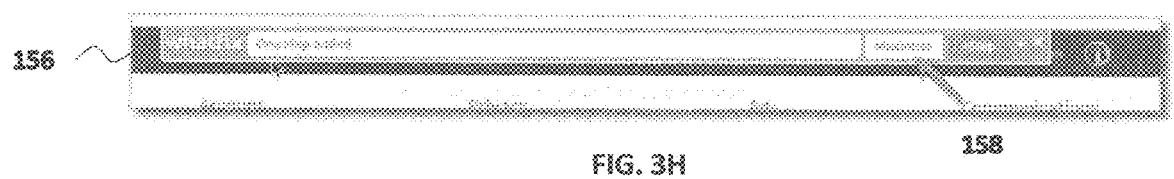
Figure 3I:
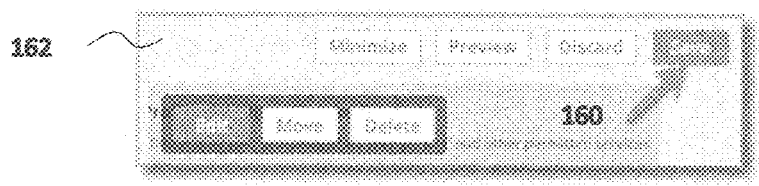

To capture the next step in the sequence, the Flow author then navigates to where in the underlying software application the author wants to start the next step. The author then clicks the +Step button 154 in the editor toolbar 156, as shown in FIG. 3G. The pointer icon again changes to indicate that the editor is waiting for the author to select another step of the sequence, as previously described in reference to FIG. 3E. The author then repeats the intervening actions described above for each step that is to be added to the Flow sequence. When all the steps have been captured, the author clicks the Maximize button 158 on the editor toolbar 156, as shown in FIG. 3H, and then clicks the Save button 160 after window 162 opens, as shown in FIG. 3I.

Before various walkthroughs are made available to end users of the underlying software application, segmentation or mapping may be used to associate each walkthrough with a particular page or part of the underlying software. Segmentation helps content authors display only walkthroughs that are relevant to end users when they are on a particular page. Segmentation, as the name implies, provides a way of targeting walkthroughs to specific users on "widgets" like Self-help and Task List on previously described content playback module 112. Segments can be defined through various conditions and rules. In some embodiments, a segment can be built to filter walkthroughs as per user login, the contents of a Uniform Resource Locator (URL), elements on the screen, and/or a mix of other criteria. For example, segments may be used to display walkthroughs based on a particular group of users' logins, a current tab an end user is on, visual elements on pages of the underlying software and/or other variable(s) defined by the walkthrough author.

Figure 4A:
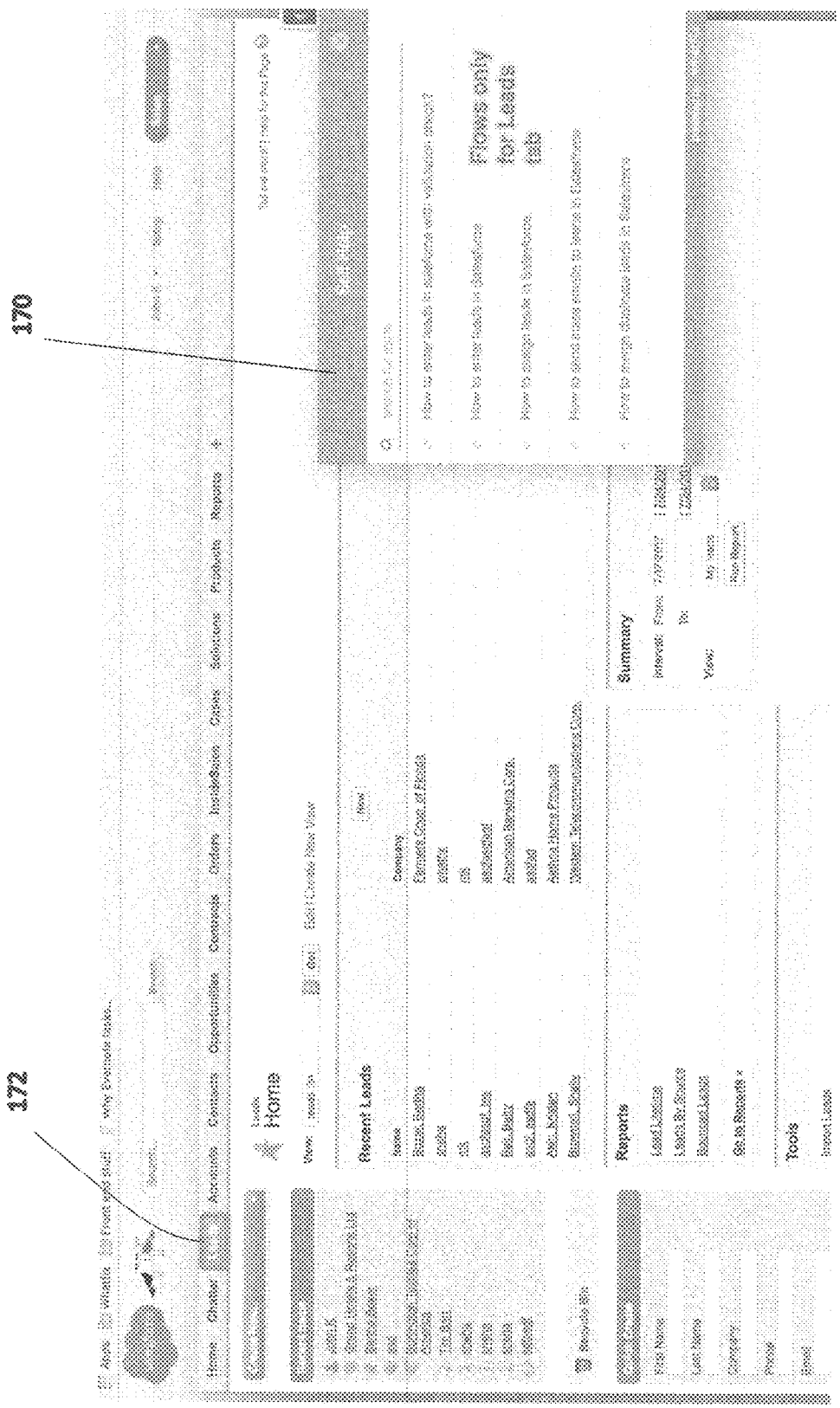
FIGS. 4A and 4B are screenshots showing examples of different lists of walkthroughs that are displayed by a content playback module depending on the location of an end user in an underlying software application.
Figure 4B:
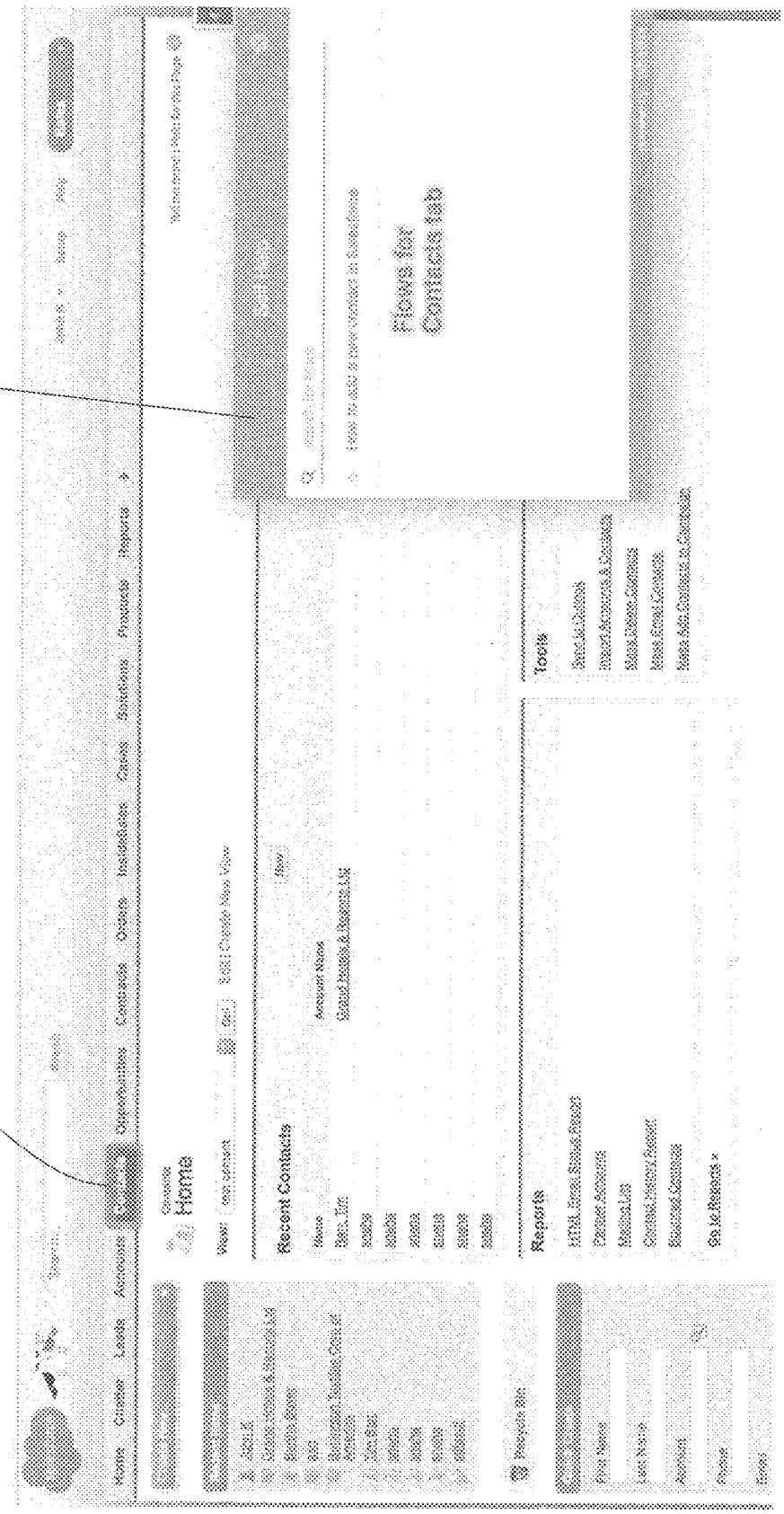

In one embodiment, a page of the underlying software application may have two different tabs, for example: Leads and Contacts. Using segments, different walkthroughs can be displayed depending on which tab the end user navigates to. Rather than seeing a long list of help content, the end user only sees contextual content that is relevant to the particular page and tab currently being used. FIG. 4A shows an example of a list of walkthroughs 170 that is displayed by content playback module 112 when the end user has navigated to the Leads tab 172 of an underlying Salesforce application and clicked on Self Help. FIG. 4B shows an example of a different list of walkthroughs 174 that is displayed by module 112 when the end user has navigated to the Contacts tab 176.

Segments can be created through a simple selection of walkthroughs and visibility rules provided in the editor module 110. To segment walkthroughs, an author can manually select all the necessary flows/walkthroughs to display on a particular page of the application. Segmentation can be set up based on tags as well. Tags can be as simple as a user group or the page/module name. Segmentation of flows can be set up through single or multiple tags. In some embodiments, the editor module 110 can perform segmentation on the basis of visual elements found in the application. The editor can segment flows based on visual elements present or absent on various pages of the underlying application.

Referring to FIGS. 5A-5I, specific examples of types of segmentation criteria that may be used are provided.

Figure 5A:
FIGS. 5A-5I are a series of partial screenshots showing examples of types of segmentation criteria.

Referring to FIG. 5A, a Uniform Resource Locator (URL) may be used to segment flows. In some embodiments, any part of the URL may be specified as a visibility rule. For example, the URL Hostname, path, parameter, etc. may be specified using this criterion.

Figure 5B:
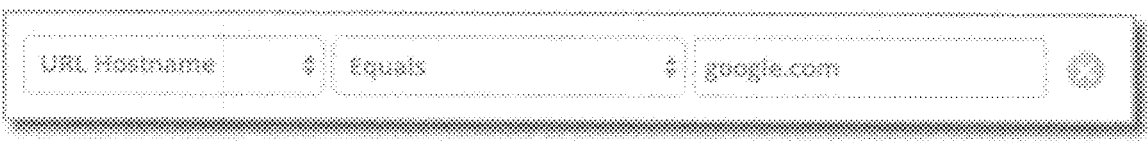

Referring to FIG. 5B, a URL Hostname may be used to segment flows. In some implementations, a content author may want to uniquely identify a page using the domain name and can use this condition. The URL Hostname is the first part of any URL. For example, if the author wished to display the tip only if the end user is on google.com, she can add a condition as shown in the screenshot of FIG. 5B.

Figure 5C:
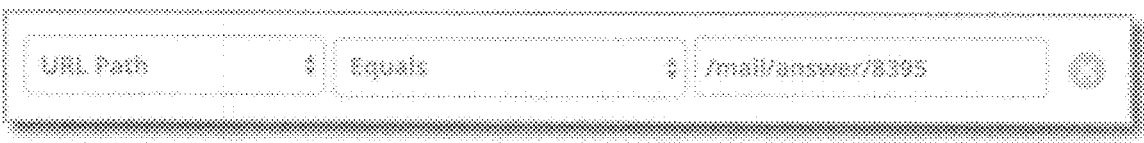

Referring to FIG. 5C, a URL Path may be used to segment flows. The website path name is what is listed between a domain name and the parameters or hashes. For example, if the website URL is //support.google.com/mail/answer/8395?h1=en&ref topic=3394219, then the pathname is /mail/answer/8395. This condition may be specified as shown in FIG. 5C.

Figure 5D:
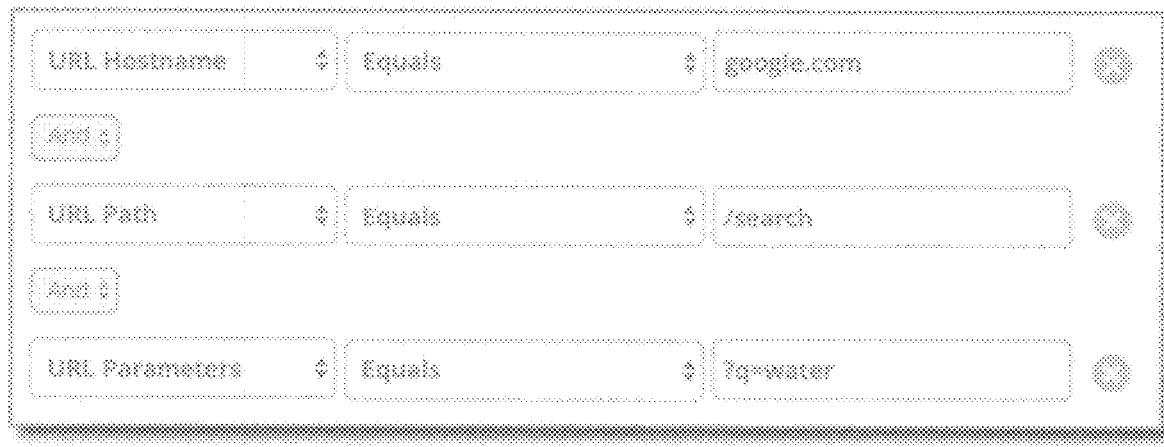

Referring to FIG. 5D, a URL Parameter may be used to segment flows. If an author wishes to identify a web page using the parameters on the URL, this condition may be used. For example, if a tip is to be shown to a user only when the search phrase has "water" in Google, this can be set up as shown in FIG. 5D. In this example, three conditions need to be met: 1) the page must be google.com (URL Hostname); 2) the pathname is /search (URL Path); and 3) the query parameter is ?q=water.

Figure 5E:
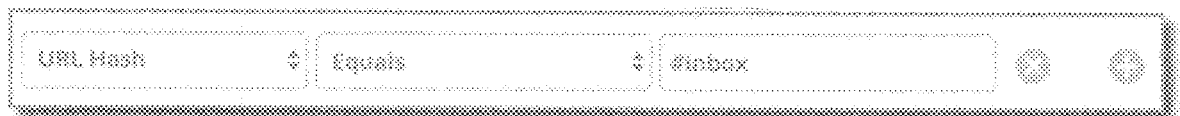

Referring to FIG. 5E, a URL Hash may be used to segment flows. In particular, a page may be identified using the hash value of the URL using this condition. Hashes are usually present in Single page applications made using AngularJs or ReactJs. Typically, there are no page refreshes but only Hash changes.

Figure 5F:
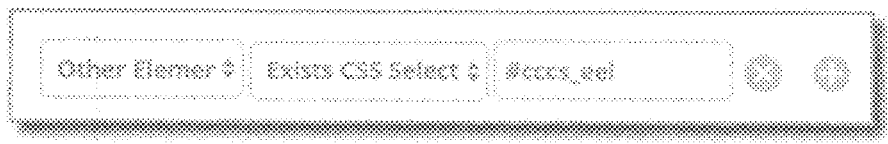

Referring to FIG. 5F, Other Elements may be used to segment flows. For example, if a content author wants to identify a page based on the presence of a particular element (other than the one selected by the author for the flow) on the web page, this condition can be used. In some embodiments, the values passed to this condition are Cascading Style Sheets (CSS) selectors, such as #ID, .class or Jquery. Cascading Style Sheets is a stylesheet language used to describe the presentation of a document written in HTML or XML. CSS describes how elements should be rendered on screen or on other media. Note that in some implementations, use of this condition to segment flows can slow down the underlying application. Further information on the use of CSS selectors may be found on the internet, such as at https://developer.mozilla.org/en-US/docs/Web/CSS/CSS-_Selectors.

Figure 5G:
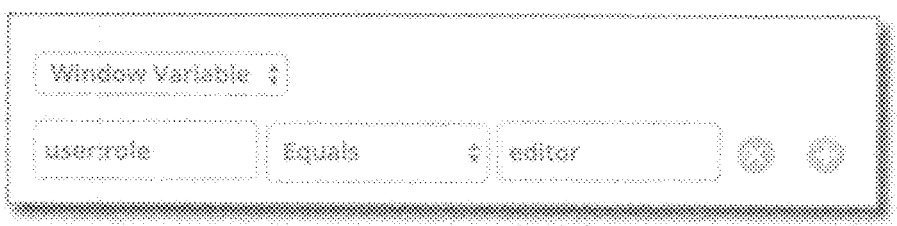

Referring to FIG. 5G, a Window Variable may be used to segment flows. In some implementations, a value of a particular JavaScript global variable is used to identify conditions for showing tooltips. For example, an option to check "user.role='admin'" may be provided to set this condition. This option may also be to perform comparisons, such as using the following criteria: Greater than; Less than; Date Greater than; or Date Less than.

Figure 5H:
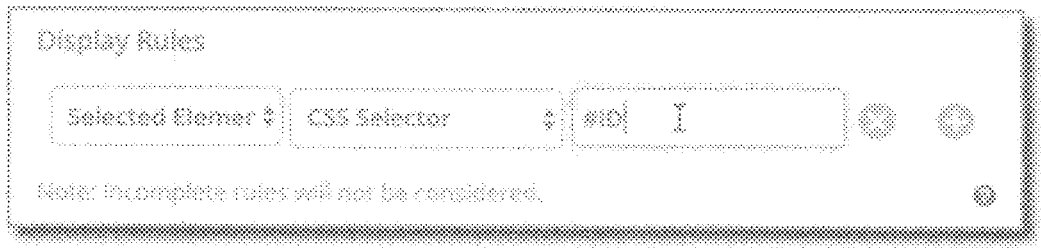

Referring to FIG. 5H, an Element CSS Selector/JQuery may be used to segment flows. In some implementations, the application uses unique IDs for some elements on the page. This option may be used when the element is selected from a list of options. For example, a drop-down menu. This lets an author provide their own CSS selector identifier for the element. Sample values include: #ID_ELEMENT; CLASSNAME; input[title="Search"]; and $("#ID").

Figure 5I:
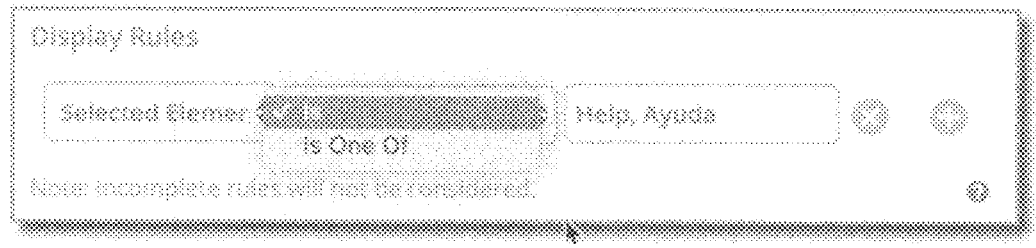

Referring to FIG. 5I, an Element Text may be used to segment flows. In some implementations, this is the text that is displayed on the Element selector that is described above in reference to FIG. 5H. If an application supports multiple languages, the option "is one of" may be chosen and the name added with a comma (,) as a delimiter.

The exemplary segmentation criteria described above with reference to FIGS. 5A-5I may be used to manually segment various flows/walkthroughs and other content. According to aspects of the disclosure, editor module 110 may also be configured to automatically segment the content. In some embodiments, the content is automatically segmented as it is created, with no additional steps required by the content author. This may be referred to as "intelligent segmentation" (IS). In some embodiments, intelligent segmentation eliminates the need to create multiple segments (manually) to display relevant content contextually to different audiences on an underlying application. For example, if an underlying application has five pages and two user roles, traditionally ten segments would need to be created to ensure that each kind of user sees only the relevant topics on each of the five pages. But when intelligent segmentation is enabled and content is being created, editor module 110 can automatically determine which content is to be shown on which page. In some embodiment, editor module 110 can do this based on where the walkthrough was created and certain other pre-defined criterion. The content author need not do any additional configuration as more content is created.

Intelligent segmentation can also ensure that if an end user is not on the first screen of a walkthrough, playback of the walkthrough starts from the most relevant page that the user is on. For example, the walkthrough that the user is launching may have 10 steps. If the user is already in step 3 on the application and then decides to launch the walkthrough, IS ensures that the walkthrough starts from step 4 and not from the earlier steps that the user has already completed.

Currently when the users open self-help, all the users see the same set of contents as designed by the content creators. But the needs of individual users vary and hence, they must spend time seeking out the particular content they need. Instead, the contents can be personalized for every user based on a recommendation engine as described herein, so that users find the content they need upfront when they open self-help. Users also find self-help more useful and their engagement with self-help goes up. This results in self-help being used more often and not for longer period of time, thereby improving user engagement.

According to aspects of the present disclosure, systems and methods are provided for personalizing the previously described digital guidance content. Referring to FIGS. 6-11, an exemplary embodiment of system 600 implemented according to aspects of the present disclosure will be described. This exemplary embodiment is premised on the hypothesis that users who behave similar to each other on an underlying application need a similar kind of help as they are aware/unaware of similar facets of the application.

Referring first to FIG. 6, an underlying application is first identified in which it is desired to provide personalized guidance content. Next, different pages of the underlying application are identified from which usage data will be gathered. In this exemplary embodiment, ten pages are identified, labeled Page 1 through Page 10. Usage data of the underlying application is gathered at the user level for n days, with n being a hyperparameter. In this exemplary embodiment, there are ten users identified as u1 through u10. The number of visits made by each user on the application is recorded. Also recorded is the amount of time each user spends on each of the different pages of the underlying application. From this, a user behavior matrix can be created, with row indexes being the user IDs and the columns being different pages of the application, as shown in FIG. 6. The values in this matrix can take different forms and can act as a hyperparameter. In this exemplary embodiment, the matrix values are the sum of time spent by each user across visits on each of the pages, with dummy values provided in FIG. 6 for ease of understanding. In alternate embodiments, the matrix values can be the average time spent per visit on these pages by the users. In some embodiments, the values of the matrix are standardized. For example, the values can be rescaled to have a mean of 0 and a standard deviation of 1 (unit variance). In other embodiments, the values of the matrix are normalized. For example, the values can be rescaled so that they all fall into a range of 0 to 1, or 0 to 1000. Each of the rows of this matrix can act as a vector that defines each user's behavior on the underlying application.

Using the values from the matrix of FIG. 6, user similarity between each pair of users can be calculated. The similarity may be calculated based on different distance metrics, such as:

Correlation
Euclidean Distance
Manhattan Distance
Minkowski Distance
Hamming Distance In this exemplary embodiment, the following correlation formula is used:

$$r_{xy} = \frac{\sum (x_i - \bar{x})(y_i - \bar{y})}{\sqrt{\sum (x_i - \bar{x})^2 \sum (y_i - \bar{y})^2}}$$

A sample correlation calculation is provided in FIG. 7, using the above formula and the values from FIG. 6, for just the pairing of u1 with u6. As shown, a correlation of 0.38 results between u1 and u6, which is recorded in the first line of the chart of FIG. 8. These similarity calculations can act as a hyperparameter. In some embodiments, all the users who have consumed at least one unit of content in a selected period of n days are considered for "click users", while the users for whom the system is recommending content are termed "recommendation users."

Referring to FIG. 9, in order to come up with recommendations for a user (for example, u6), the similarity of click users with u6 and the number of times a particular piece of content (i.e., Content IDs c1 through c9 in this example) was consumed by the click users can be considered. Only the pairings of user u6 with the other users are shown in this example. In some embodiments, each Content ID represents a separate "walkthrough" as previously described. A number of click users most similar to u6 may be chosen to proceed with the calculations. The number of most similar click users can also be a hyperparameter. In this example, the number of most similar click users is 8, with users u9 and u10 being dropped from further calculations. The Score column in FIG. 9 can be calculated as the product of the Consumption Count and the Similarity number for each pairing of Content ID and click user.

Referring now to FIG. 10, the Scores from FIG. 9 can be summed up for each Content ID to get the Intermediate Score, and the number of users who clicked on each piece of content can be counted, as shown. Next, the final score of each piece of content for every user may be obtained by dividing the Intermediate Score by the Click User Count. The ranking order can then be decided by the final score in descending order, as shown. The personalized help system can now recommend help content based on these rankings. In some embodiments, only the top result is provided to the underlying user. In other words, only the walkthrough or other content associated with Content ID c1 is provided to the user u6 when they are on a particular page of the underlying application. In some embodiments, only the top X pieces of content are provided, where X is 1, 2, 3 or more. For example, if X is predetermined to be 3, then the content associated with Content IDs c1, c6 and c4 would be shared with user u6 in this example. In some embodiments, only content above a certain Final Score may be shared. For example, if a Final Score limit of 7.5 is set, then the content associated with Content IDs c1 and c6 would be shared with user u6 in this example since only those pieces of content had a Final Score above 7.5. In some embodiments, all of ranked content is provided to the underlying user in ranked order.

Figure 11:
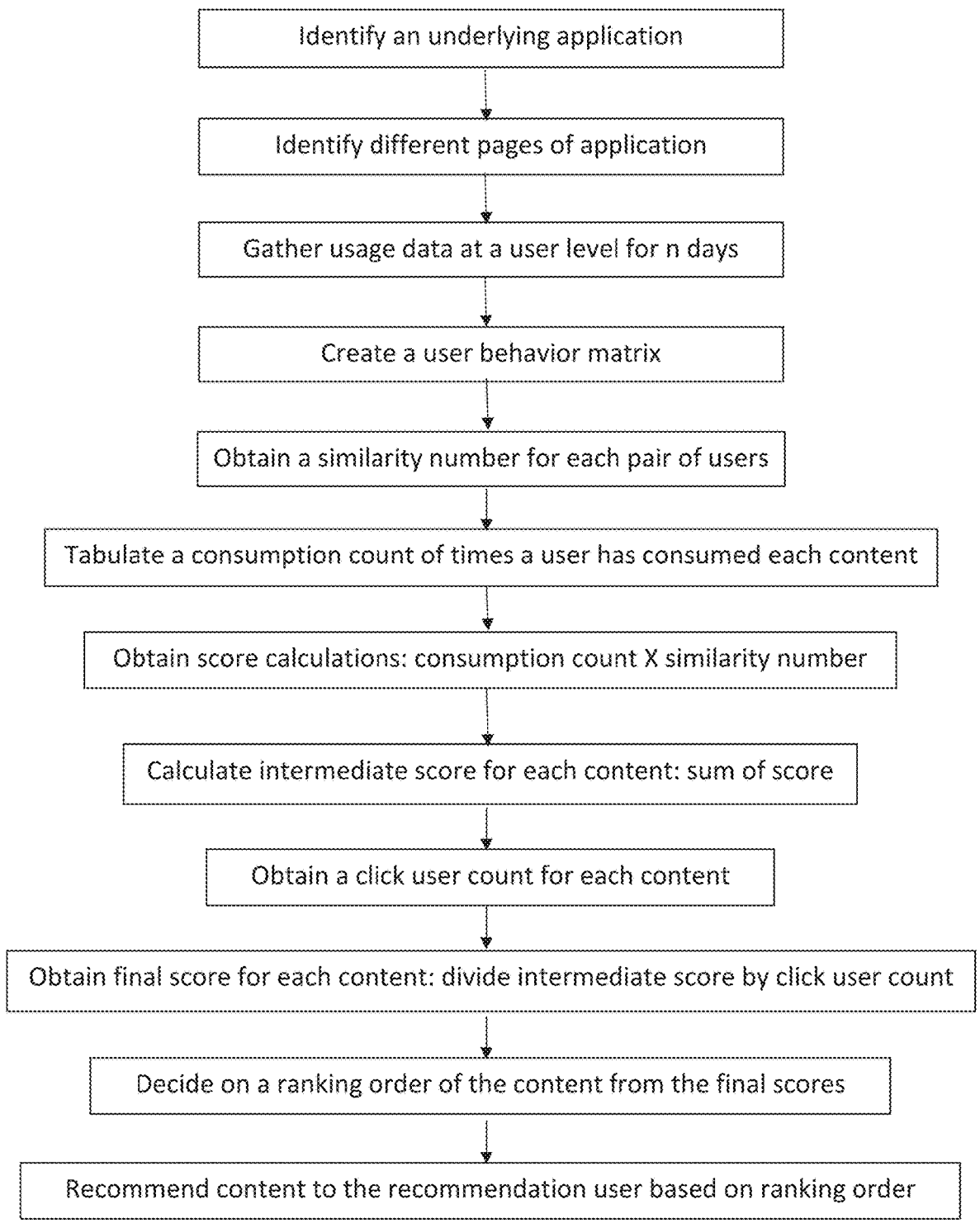
FIG. 11 is a flow chart summarizing steps of an exemplary digital guidance content personalization method.

Referring to FIG. 11, a summary of the steps of the above exemplary personalization method is provided.

A hyperparameter is a configuration that is external to the model and whose value may not be able to be estimated from the data. Hence, these values may be used as an input to the model and decided through hit and trial methods. In some embodiments, in order to decide the final values of the hyperparameters, a grid search may be performed (e.g., recommendations may be generated for each set of options) on the historical data and the results may be checked against more recent data. In some embodiments, the process involves machine learning where the output is checked against actual usage to finalize the values of the hyperparameters.

When used in the Digital Adoption Platform category, the above-described user similarity matrix may be improved in some embodiments by considering one or more of the following factors to adjust the calculated content recommendations:

A user's role/job function information

Auto tags to help identify different pages of the application at different granularities Seasonality/Cyclic behavior, as certain specific applications have seasonal/cyclic usages, such as Human Capital Management (HCM) tools Number of days user has been using the application (i.e., maturity level of the user with respect to the application)

The User Actions/processes a particular user performs on the application

The above-described exemplary system is General Data Protection Regulation (GDPR) compliant, so minimal data may be used. No Personal Identifiable Information (PII) need be used in determining the recommendations.

"User buckets" may be created to capture the user data described above. The user buckets can be completely dynamic in nature. For example, they may be recreated every day based on the last n days of data. Also, the buckets may be created from the perspective of the user being recommended. For example, for user u6, the buckets can be {u1, u2, u6}, while for user u1, the buckets can be {u1, u3, u7}.

As previously mentioned, not all the click users need be used to decide the recommendations. Rather, a fewer number of most similar click users will often yield better content recommendations for a recommendation user.

In this exemplary embodiment, the recommendations are agnostic to underlying changes to the application as the system does look at the time spent on the page and not what the content of the page is.

Consideration of only the last n days keeps the recommendation relevant to the system and the user. This can ensure that past usage does not skew current recommendations. In some embodiments, the recommendations are updated every day.

A new user can instantly be provided with a recommendation after 1 day of being in the system. A separate bucket can be designed for new users to check their behavior.

Enterprise Customization requests can also be entertained, e.g., content creators' requests for ordering certain contents may also be taken care of. This allows those in the Digital Adoption Platform category to maintain a direct line of communication with their content creators.

Recommendations for a given user can be different for different pages of the underlying application, making the contents more relevant to a given page.

Various alternatives, modifications, and equivalents may be used in lieu of the above components. Additionally, the techniques described here may be implemented in hardware or software, or a combination of the two. The techniques may be implemented in computer programs executing on programmable computers that each includes a processor, a storage medium readable by the processor (including volatile and nonvolatile memory and/or storage elements), and suitable input and output devices. Program code may be applied to data entered using an input device to perform the functions described and to generate output information. The output information may be applied to one or more output devices.

Each program may be implemented in a high-level procedural or object-oriented programming language to operate in conjunction with a computer system. However, the programs may be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Thus, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control or perform any of the steps, including but not limited to: displaying, communicating with the user, analyzing, modifying parameters (including timing, frequency, intensity, etc.), determining, alerting, or the like.

While exemplary embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached, or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the disclosure. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present disclosure.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and/or methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims. When a feature is described as optional, that does not necessarily mean that other features not described as optional are required.

The examples and illustrations included herein show, by way of illustration and not of limitation, specific embodiments in which the subject matter may be practiced. As mentioned, other embodiments may be utilized and derived therefrom, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of personalizing digital guidance for use in an underlying computer application, the method comprising the steps of:
    identifying an underlying application in which it is desired to provide personalized guidance content;
    identifying different pages of the underlying application from which usage data will be gathered;
    gathering usage data of the underlying application at a user level for n days;
    creating a user behavior matrix from the gathered data with one axis of the matrix representing users of the underlying application and another axis of the matrix representing the different pages of the underlying application, wherein values in the matrix represent a predetermined measure of each of the users' behavior on the different pages;
    using the behavior matrix, performing a user similarity calculation for each pair of the users to obtain a similarity number for each of the pairs of users;
    tabulating a consumption count for each of the users and a particular piece of digital guidance content each user has consumed, each of the consumption counts reflecting a number of times a particular user has consumed the particular content;
    using the user similarity numbers and the consumption counts, performing a series of score calculations for a recommendation user, wherein each of the score calculations is a product of one of the consumption counts and an associated one of the similarity numbers;
    calculating an intermediate score for each of the pieces of content from the tabulating step, wherein each of the intermediate scores is calculated by summing the series of score calculations for each of the pieces of content;
    counting a number of users who clicked on each of the pieces of content to obtain a click user count for each piece of content;
    obtaining a final score for each of the pieces of content by dividing its intermediate score by its click user count;
    deciding on a ranking order of the content for the recommendation user based on the final scores placed in descending order; and
    recommending at least a highest ranked piece of content from the ranking step to the recommendation user.

2. The method of claim 1, wherein the gathering usage data step comprises recording a number of visits made by each of the users on the underlying application.

3. The method of claim 1, wherein the gathering usage data step comprises recording an amount of time each of the users spends on each of the different pages of the underlying application.

4. The method of claim 1, wherein the values of the user behavior matrix act as a hyperparameter.

5. The method of claim 1, wherein the values of the user behavior matrix comprise a sum of time spent by each of the users across visits on each of the different pages.

6. The method of claim 1, wherein the values of the user behavior matrix comprise an average amount of time spent by the users per visit on the different pages.

7. The method of claim 1, further comprising a step of standardizing the values of the user behavior matrix.

8. The method of claim 7, wherein the step of standardizing the values comprises rescaling the values to have a mean of 0 and a standard deviation of 1.

9. The method of claim 1, further comprising a step of normalizing the values of the user behavior matrix.

10. The method of claim 9, wherein the step of normalizing the values comprises rescaling the values so that they all fall into a range of 0 to 1.

11. The method of claim 1, wherein the user similarity calculations are based on one or more distance metrics selected from a group consisting of Correlation, Euclidean Distance, Manhattan Distance, Minkowski Distance and Hamming Distance.

12. The method of claim 1, wherein the user similarity calculations act as a hyperparameter.

13. The method of claim 1, wherein the pieces of content comprise walkthroughs.

14. The method of claim 1, wherein all of the users who have consumed at least one of the pieces of content during the n days are used in the user similarity calculations.

15. The method of claim 14, wherein some of the users who have consumed at least one of the pieces of content during the n days but have a low similarity number are not used in the tabulating and subsequent steps.

16. The method of claim 15, wherein a quantity of the users who have a high similarity number and are used in the tabulating and subsequent steps is used as a hyperparameter.

17. A non-transitory computer readable medium having instructions stored thereon for personalizing digital guidance for use in an underlying computer application, wherein the instructions are executable by a processor to cause a computer to:
 identify an underlying application in which it is desired to provide personalized guidance content;
 identify different pages of the underlying application from which usage data will be gathered;
 gather usage data of the underlying application at a user level for n days;
 create a user behavior matrix from the gathered data with one axis of the matrix representing users of the underlying application and another axis of the matrix representing the different pages of the underlying application, wherein values in the matrix represent a predetermined measure of each of the users' behavior on the different pages;
 use the behavior matrix to perform a user similarity calculation for each pair of the users to obtain a similarity number for each of the pairs of users;
 tabulate a consumption count for each of the users and a particular piece of digital guidance content each user has consumed, each of the consumption counts reflecting a number of times a particular user has consumed the particular content;
 use the user similarity numbers and the consumption counts to perform a series of score calculations for a recommendation user, wherein each of the score calculations is a product of one of the consumption counts and an associated one of the similarity numbers;
 calculate an intermediate score for each of the pieces of content from the tabulating step, wherein each of the intermediate scores is calculated by summing the series of score calculations for each of the pieces of content;
 count a number of users who clicked on each of the pieces of content to obtain a click user count for each piece of content;
 obtain a final score for each of the pieces of content by dividing its intermediate score by its click user count;
 decide on a ranking order of the content for the recommendation user based on the final scores placed in descending order; and
 recommend at least a highest ranked piece of content from the ranking step to the recommendation user.

18. The non-transitory computer readable medium of claim 17, wherein the values of the user behavior matrix comprise a sum of time spent by each of the users across visits on each of the different pages.

19. The non-transitory computer readable medium of claim 17, wherein the values of the user behavior matrix comprise an average amount of time spent by the users per visit on the different pages.

20. The non-transitory computer readable medium of claim 17, wherein the user similarity calculations are based on one or more distance metrics selected from a group consisting of Correlation, Euclidean Distance, Manhattan Distance, Minkowski Distance and Hamming Distance.

* * * * *